United States Patent [19]

Broling

[11] 3,942,454

[45] Mar. 9, 1976

[54] ADJUSTABLE COMPRESSION UNIT AND LADING BAND ANCHOR

[75] Inventor: Keith W. Broling, Olympia Fields, Ill.

[73] Assignee: Portec, Inc., Oak Brook, Ill.

[22] Filed: June 19, 1974

[21] Appl. No.: 480,976

[52] U.S. Cl. ............................. 105/472; 280/179 A
[51] Int. Cl.² .......................................... B60P 7/10
[58] Field of Search ........... 105/471, 472, 466, 469, 105/470, 488, 477; 280/179 R, 179 A; 267/67, 73, 74

[56] References Cited
UNITED STATES PATENTS

| 3,209,706 | 10/1965 | Broling | 105/472 |
| 3,462,137 | 8/1969 | Grube | 105/472 X |
| 3,678,866 | 7/1972 | O'Leary et al. | 105/472 |

Primary Examiner—M. Henson Wood, Jr.
Assistant Examiner—Gene A. Church
Attorney, Agent, or Firm—Hill, Gross, Simpson, Van Santen, Steadman, Chiara & Simpson

[57] ABSTRACT

The system comprises band anchors uniformly spaced along opposite sides of a flat-decked vehicle, such as a railway flatcar. Each band anchor includes a pair of transversely extending facing channels flush with the deck of the car and having ratchet teeth depending from the top legs of the channels. An anchoring member is adjustably mounted between the channels and has teeth engageable with the ratchet teeth of the channels as tension on the band is taken up. The ratchet teeth cam and retain the anchoring members into engagement with the sides of the load as the bands are under tension. The anchoring members are non-flexible when under no load and each has an outer link with a compression member interposed between the outer link and anchoring member to accommodate extension of the outer link upon longitudinal shifting of the load.

15 Claims, 7 Drawing Figures

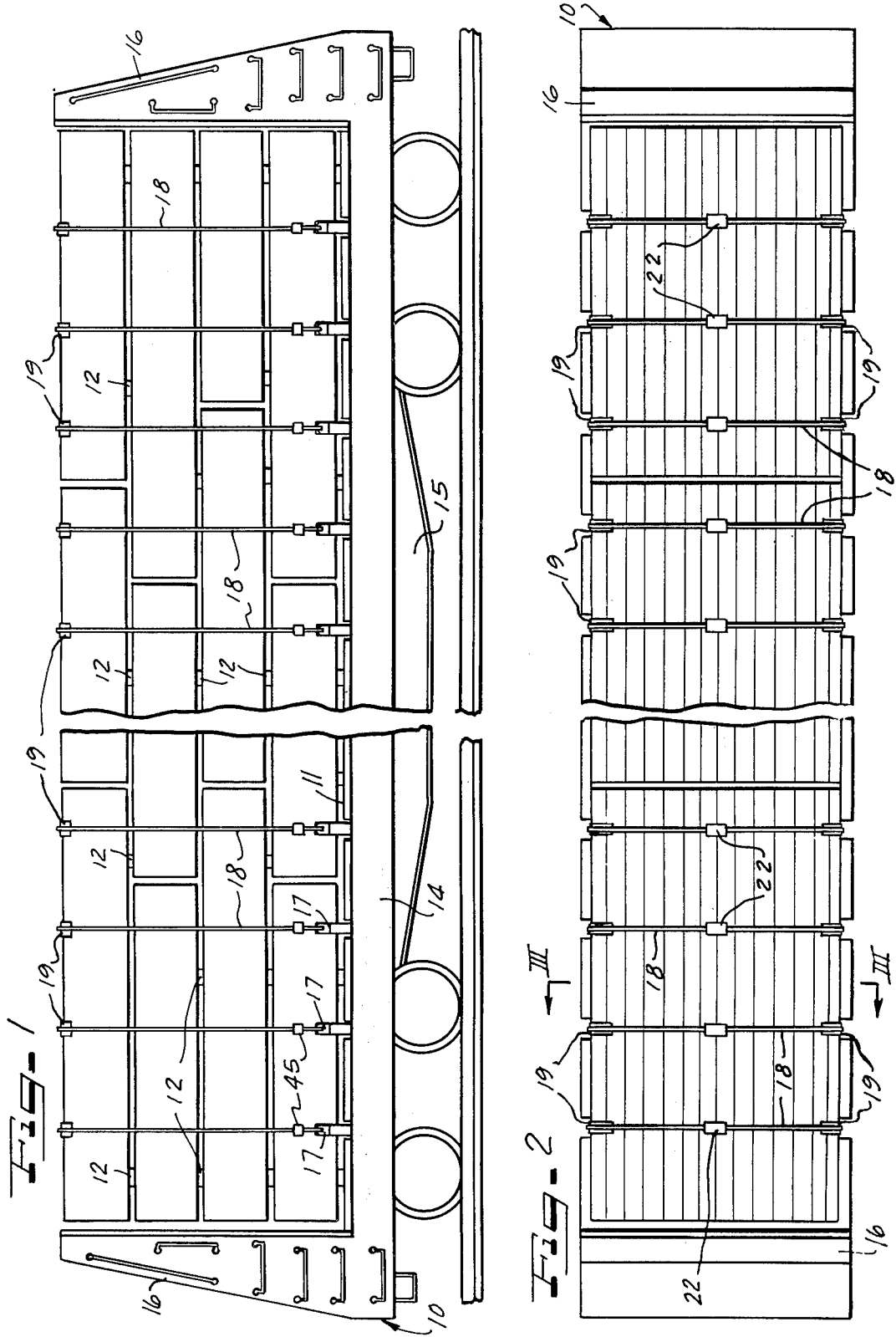

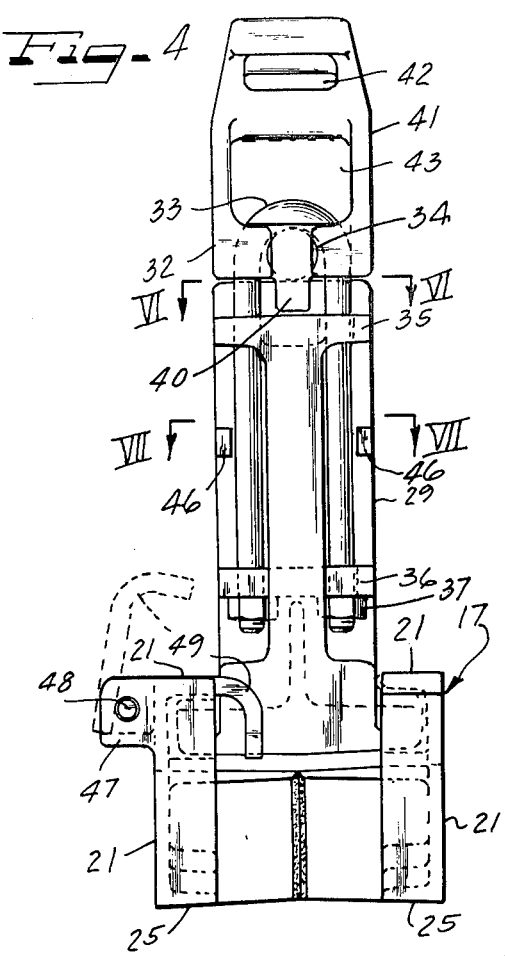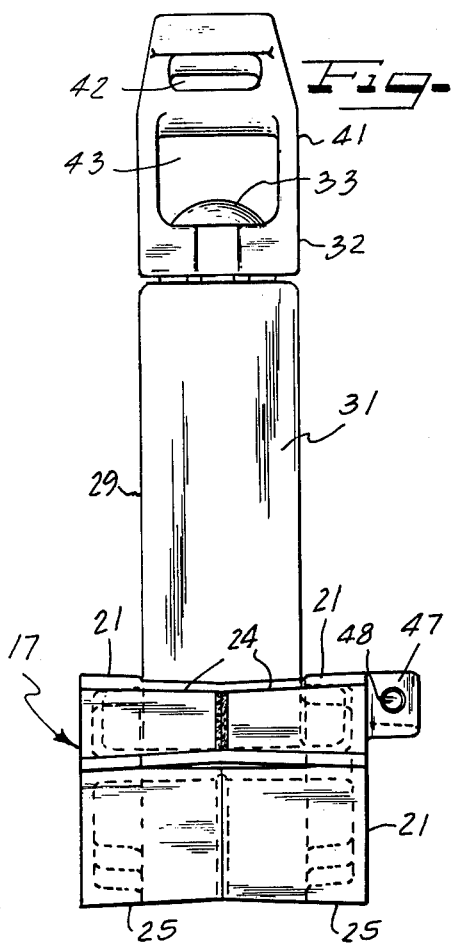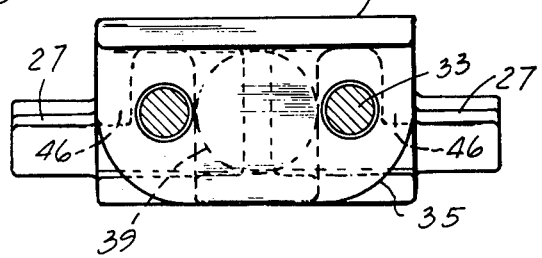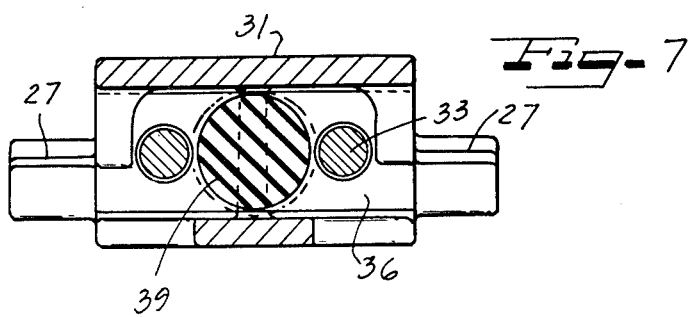

ADJUSTABLE COMPRESSION UNIT AND LADING BAND ANCHOR

PRIOR ART

Pertinent prior art is the Patent to Broling U.S. Pat. No. 3,209,706 and the Patent to O'Leary et al. U.S. Pat. No. 3,678,866.

BACKGROUND, SUMMARY AND ADVANTAGES OF INVENTION

Flat lading, such as stacks of lumber, has been tied to the deck of a flatcar by chains, as shown in U.S. Pat. No. 3,209,706. Chains, however, require tensioning devices forming a part of the tiedown, which must be stored when the car is empty and are expensive and heavy. Chains are also subject to theft, which is quite common in certain areas.

In order to reduce theft of the chains, double banding has been used, as shown in U.S. Pat. No. 3,678,866. Double banding, however, has utilized compression units to attach the banding to the sides of the car, which are stored beneath the deck of the car and attached to the car by chains, welded to the sides of the car. These unit, including the springs and chains, must be lifted when banding the load. This increases the effort required to band the load and does not confine or protect the load against lateral shift. The units are otherwise objectionable due to their flexibility with the result that the units tend to flop around when in transit and not in use.

By the present invention, single banding is used and anchoring units are adjustable to the width of the load. These anchoring units are close coupled, but compressible blocks in the anchoring units allow angular movement of the units when the load shifts longitudinally. The anchoring units also are cammed to lean against the load into firm engagement with the sides of the load as the bands lift the anchoring members by taking up of tension on the bands and compressing the elastomeric members.

An advantage of the present invention, therefore, is the reduction in effort required to band the load and the positive engagement and leaning of the anchoring members into engagement with the sides of the load.

A further advantage is in the non-elasticity of the banding members, guiding the load when longitudinal shift occurs, and conforming to the load without overloading the bands.

A further advantage is the positive holding of the load from lateral shifting and the accommodation of the load to shift longitudinally due to impacts on the car.

A still further advantage in the invention is the arrangement of the system for single strand banding and the ability of the anchoring units to take care of different widths of bands as required to effectively hold a load to a flatcar.

Another advantage of the invention is the arrangement of the anchoring units to be cammed into engagement with the sides of the car as the bands are tensioned over the load.

Other objects, features and advantages of the invention will be readily apparent from the following description of a preferred embodiment thereof, taken in conjunction with the accompanying drawings, although variations and modifications may be effected without departing from the spirit and scope of the novel conecpts of the disclosure.

DESCRIPTION OF THE DRAWINGS

FIG. 1 is a view in side elevation of a railway flatcar in which lading, such as packaged lumber, is stacked and tied down by banding in accordance with the principles of the present invention;

FIG. 2 is a top plan view of the loaded flatcar shown in FIG. 1;

FIG. 4 is an enlarged front view of the banding unit shown in FIG. 3;

FIG. 5 is a view showing the opposite side of the banding unit from that shown in FIG. 4;

FIG. 6 is a sectional view taken substantially along line VI—VI of FIG. 4; and

FIG. 7 is a sectional view taken substantially along line VII—VII of FIG. 4.

DESCRIPTION OF PREFERRED EMBODIMENT OF INVENTION

Figure 3:
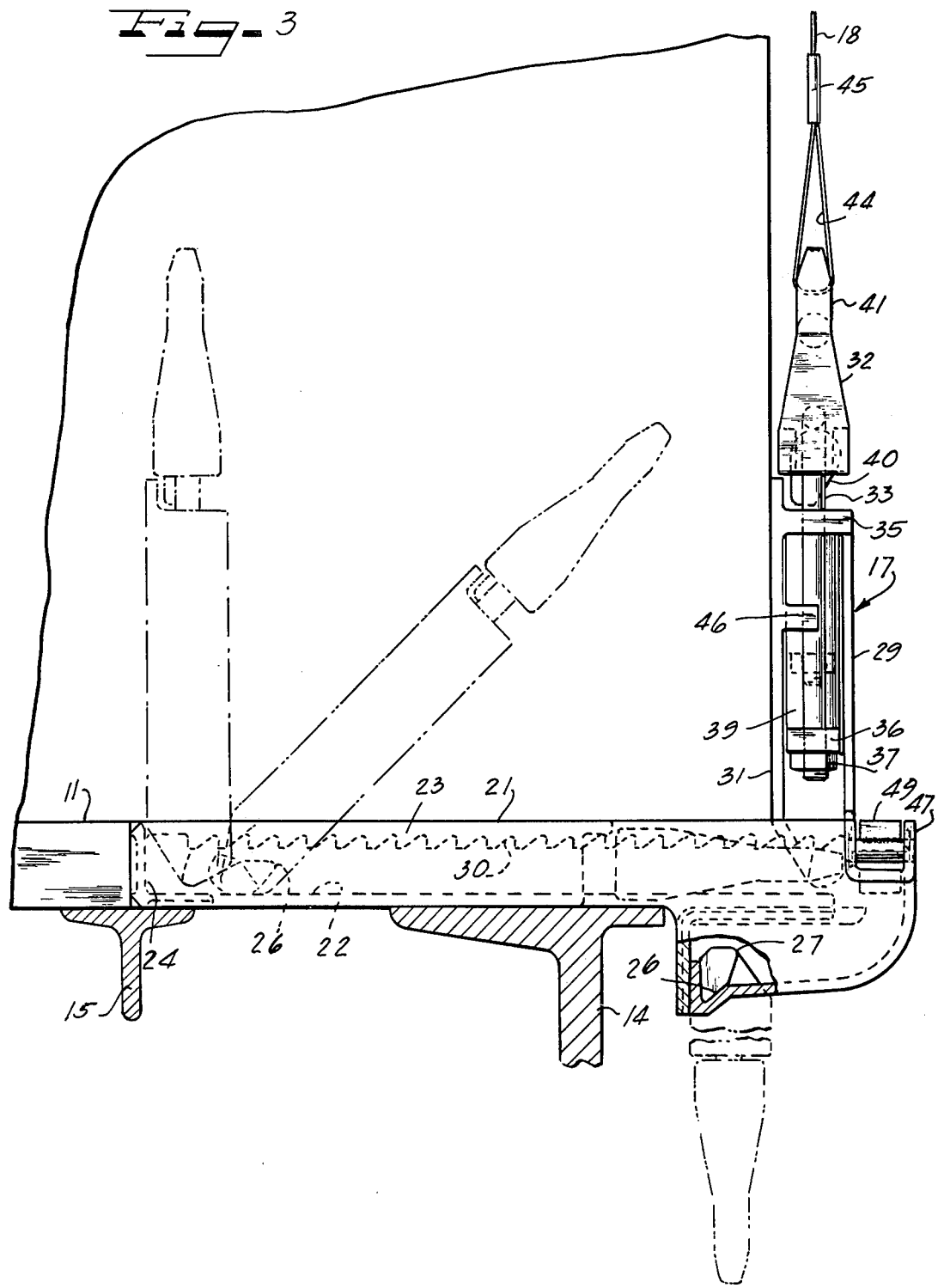
FIG. 3 is an enlarged partial sectional view taken substantially along line III—III of FIG. 2.

FIGS. 1 and 2 of the drawings show a lading transporting vehicle, shown as being a railway flatcar 10, having a flat deck 11, but which may be a flat-decked truck or trailer or other form of transporting vehicle commonly used for transporting lumber or other flat stacked material. The lumber is shown as being in stacks or bundles in which the bundles are stacked one on top of the other and are arranged in end-to-end relation along the deck of the car. As shown in FIG. 1, spacers 12 extend transversely of the car and space the bundles from the flat deck of the car and from each other to provide spacing between the bundles for the forks of a fork-lift truck to permit the fork-lift truck to load and unload the bundles of lumber from the car.

The car generally includes side sill structures 14, floor stringers 15 and end bulkheads 16 at opposite ends of the car accommodating limited longitudinal movement of the lading upon impacts which normally occur upon sudden stops and upon the taking up of slack in the draft gear when starting the train.

Spaced along each side of the car are band anchors 17 for load restraining members such as bands 18 extending over the load under tension. The bands 18 are protected from the load by corner protectors 19 and are shown as single strand bands extending from the band anchors over the load and placed under tension by a conventional tensioning tool (not shown) such as a windlass, an over-center leverage device or fluid pressure types of tensioning tools commonly used to tension banding. The tension may be in the order of 3,000 lbs. Adjacent ends of the tensioned bands may then be spliced together by crimp splices 22. The bands may also have a conventional safety loop (not shown) connected therein between the connected ends of the banding to prevent snapping of the banding when cutting. Such safety loop is shown and described in U.S. Pat. No. 3,678,866 and is no part of the present invention, so need not herein be shown or described further.

The band anchors 17 spaced along the car and aligned with each other on opposite sides of the car each comprise a pair of facing channels 21 recessed level with the top of the deck 11 and welded or otherwise secured to the tops of the side sills 14 and floor stringers 15. The channels each include vertically spaced legs 23 extending horizontally from the web of the channel. An inner wall 24, which may be formed integrally with the channel structure, closes the inner end of each channel. The inner walls 24 extend inwardly of the legs 23 and may be welded or otherwise secured together at their inner ends, as shown in FIG. 4.

Forming an outer continuation of each channel 21 is a guide track 25 extending downwardly and inwardly of said channel beneath the floor of the car and terminating at its inner end in a recess 26 for ratchet teeth 27. Said ratchet teeth extend from opposite sides of an anchoring member 29 for supporting said anchoring member to extend along the side sill 14 during travel of the car and thereby forming a means for storing band anchors to depend along the side sills of the car and impede swinging action when car moves empty. The ratchet teeth 27 extending from each side of the anchoring member 29 cooperate with ratchet teeth 30 depending from the top legs 23 of the channels 21. The ratchet teeth 27 and 30 are pitched to retain the associated anchoring member 29 against the load as tension is taken up on the banding and to cam a flat inner face 31 of the anchoring member into firm engagement with the side of the load as tension is taken up on the band 18.

The anchoring member, thus, may be moved along the channels 21 into position adjacent the load. Engagement of the ratchet teeth 27 with the ratchet teeth 30 as the band anchor is lifted from the lower legs of the channels as tension is taken up on the banding will cam an inner face 31 of the anchoring member to lean against the side of the load in firm engagement therewith. This is attained by tensioning the band without lifting the anchoring member 29 except to pivot it towards the load. It is thus unnecessary to lift the anchoring member when banding the load and the anchoring member is automatically cammed into firm engagement with the load as tension is taken up on the band.

The anchoring member 29 forms a mounting for an outer link 32 of the unit and connected with said anchoring member through a U-bolt 33 engaging a bar 34 extending across said link and forming a part thereof. As shown in FIGS. 3 and 4, the U-bolt 33 slidably extends through a ledge 35 at the upper end portion of the anchoring member and through a downwardly spaced abutment member 36 slidable relative to said anchoring member. Nuts 37, threaded on the lower ends of the legs of the U-bolt, retain the abutment member to the U-bolt. Between the legs of the U-bolt and abutting the abutment member 36 and ledge 35 at its opposite end is a compressible member 39 shown as being a compressible block. The compressible member 39 may be a rubber block, an elastomeric block or a block made from another form of compressible material and serves to retain the link 32 to the anchoring member 29 as a relatively solid member when under no load, but to accommodate extensible movement of the link 32 relative to the anchoring member as said link and the band 18 are placed under tension. A stop 40 depends from the cross bar 34 and is engageable with the ledge 35 to limit retractable movement of said link relative to said anchoring member.

The link 32 has a flattened upper end portion 41, shown as having two connector slots 42 and 43 therein to accommodate the connection of different widths of banding to the link 32 in accordance with the tension required to tie down the load, or handing availability.

The band 18 is connected to the link 32 by a loop 44 formed therein by a connector 45, crimped or otherwise secured to the band 18. The connection forming the loop 44 is well known to those skilled in the art and is no part of the present invention so need not herein be shown or described further.

Longitudinal shifting of the load between the bulkheads 16, caused by impact or taking up slack in the draft gear, is accommodated by the compressible member 39. Enough clearance has been provided between the U-bolt and link 32 to accommodate angular movement of the link to enable the band to conform to the load when the load shifts. The compressible member 39 is so designed as to be capable of being compressed for substantially 50% of its height. Normal take-up of banding tension compresses the block to about 25% of its height. Compression of the compressible member is limited by stops 46 extending outwardly of the flat rear face of the anchoring member on opposite sides of the compressible member, and positioned to engage the abutment member 36 upon extreme loads on the bands.

For normal loads, as light a band as possible is trained through the apertured portion 42 of the link and serves to tie down the load. Where, however, the narrow or light bands may prove to be inadequate en route, due to operating conditions or increased tensile force required to tie down the lumber, the light bands may snap. Heavier and wider bands may then be connected with the link 32 through the apertured portion 43. Where breakage may occur en route, the narrow banding is cut from the connector links 32 and wider banding, which is always carried by the railroad, will be substituted for the narrow banding.

A stop 49 is pivoted between parallel ears 47 on a pivot pin 48. The ears extend from one channel, as shown, and support the pivot pin to extend transversely of the car. The stop 49 is shown as L-shaped in form and is movable upwardly to the dotted line position shown in FIG. 4 when it is desired to store the anchoring member along the side sill of the car. The stop 49 also retains the anchoring member 29 and link 32 to be stored horizontally between the channels 21 and retains the anchoring member between said channels during travel of the car.

I claim as my invention:

1. A tie anchor for anchoring stacked lading to the deck of a flat-decked vehicle, comprising
    a load restraining member placing said tie anchor under tension,
    a pair of facing channels extending transversely of the deck of the vehicle and having vertically spaced upper and lower legs,
    ratchet teeth depending from the upper legs of said channels,
    an anchoring member adjustably movable between said channels and resting on the lower legs thereof upon release of tension on the load restraining member,
    spaced upwardly facing ratchet teeth on opposite sides of said anchoring member and engageable with said downwardly facing ratchet teeth upon the taking up of tension on the load restraining member,
    said anchoring member having an outer link forming a solid member with said anchoring member and extensible relative thereto upon the placing of said load restraining member under a predetermined tension, a compressible member disposed between said anchoring member and said outer link and compressible as the loads on said outer link increase, and the connection between said anchoring member and outer link accommodating angular movement of said outer link to enable said load restraining member to conform to the load upon longitudinal shifting of the load caused by impacts.

2. The tie anchor of claim 1, wherein the load restraining member is a single strand band, and wherein the compressible member is a block of yieldable material.

3. The tie anchor of claim 2, wherein the anchoring member has a flat load engaging face, and wherein the cooperating ratchet teeth on said anchoring member and top legs of said channels cam said load engaging face into engagement with the load upon angular upward movement of the anchoring member as tension on the load restraining member is taken up.

4. The tie anchor of claim 3, wherein the load restraining member is a single strand band, and wherein the outer link has a plurality of apertures therein to adapt the outer link for different width bands in accordance with the load tied down.

5. The tie anchor of claim 3, wherein the channels have guide tracks forming outward and downwardly spaced inward continuations thereof to accommodate storing of the anchoring member and outer link along the side sill of a car, and wherein each guide track has an upwardly facing recessed portion therein conforming to the ratchet teeth on said anchoring member and retaining the anchoring member and outer link from swinging movement relative to the side sill when en route.

6. The tie anchor of claim 5, wherein a movable stop is pivoted to the outward continuation of a channel for movement into the path of movement of said anchoring member along said channels to retain the anchoring member and outer link for storage between said channels and to accommodate movement of the anchoring member and outer link for storage along the side sills of the car.

7. The tie anchor of claim 5, wherein the compressible member is an elastomeric block, and including a stop to limit compression of said block.

8. In a system for tying down stacked loads to a transportation vehicle having a flat deck, tie anchors spaced along each side of the deck and load restraining bands passing over the load and connected between laterally aligned tie anchors under tension, each tie anchor comprising a pair of facing channel members having longitudinally spaced top and bottom legs, ratchet teeth depending from the top legs of said channel members, an anchoring member guided between said channel members for lateral movement therebetween into engagement with the load, each anchoring member having upwardly facing ratchet teeth engageable with said downwardly facing ratchet teeth upon tensioning of the band over the load, said anchoring members each having a flat load engaging face cammed into engagement with the load by cooperation between the ratchet teeth on said anchoring members with the ratchet teeth depending from the top legs of said channel upon angular movement of the anchoring members toward the load and tensioning of the load restraining band, each anchoring member having an outer link mounted for retractable movement with respect thereto and forming a connector for a load restraining band, and a compressible member connected between said anchoring member and outer link, retaining said anchoring member and outer link and compressible upon the taking up of tension on the band and shifting of the load.

9. The system of claim 8, wherein the link has a plurality of apertures therein for receiving bands of varying widths in accordance with the load to be tied down, and wherein stop means are provided to limit compression of said compressible member.

10. The anchoring system of claim 9, wherein slack is provided in the connection between the anchoring member and outer link to accommodate angular movement of the outer link to conform to the banding upon longitudinal shifting of the load.

11. The anchoring system of claim 9, wherein a U-bolt, slidable relative to said anchoring member, connects said anchoring member and outer link, and wherein the compressible member is confined between said U-bolt and anchoring member.

12. The anchoring system of claim 11, wherein the compressible member is an elastomer and stop means are provided to limit compression of the compressible member to substantially half its length.

13. The anchoring system of claim 9, wherein the anchoring member and outer link are storable between the channels of said tie anchor, and wherein the channels extend outwardly of the side sills of the car and have trackways forming downwardly and inward continuations thereof, to accommodate storing of the anchoring members along the side sills of the car.

14. The anchoring system of claim 13, wherein the trackways have recessed portions at the lower inner ends thereof to receive the ratchet teeth on said anchoring members and to retain the tie anchors from outward movement relative to the side sills of the car when en route.

15. The anchoring system of claim 14, wherein selectively operable stop means are mounted at the outer ends of said channels for movement into position to retain the anchoring members to be stored between said channels, and into position to accommodate storing of the anchoring members along said side sills of the car.

* * * * *